July 24, 1923.

W. R. STEINHAUER ET AL

AUTOMOBILE HEADLIGHT

Filed Jan. 24, 1921

Non-Reflecting Face
Reflecting Face

Inventors
William R. Steinhauer
Jacob N. Prutzman
By Edwin S. Clarkson
Attorney

Patented July 24, 1923.

1,463,024

UNITED STATES PATENT OFFICE.

WILLIAM R. STEINHAUER AND JACOB N. PRUTZMAN, OF MOUNT VERNON, WASHINGTON.

AUTOMOBILE HEADLIGHT.

Application filed January 24, 1921. Serial No. 439,481.

*To all whom it may concern:*

Be it known that we, WILLIAM R. STEINHAUER and JACOB N. PRUTZMAN, citizens of the United States, residing at Mount Vernon, in the State of Washington, have invented certain new and useful Improvements in Automobile Headlights, of which the following is a specification.

The majority of head-lights for automobiles reflect rays of light upwardly, downwardly, and sidewise. The upwardly reflected rays have been a source of considerable annoyance to the driver of an approaching automobile, and have been the direct cause of many accidents to automobiles, and these accidents have become so numerous that State authorities have taken official notice of them and passed laws prohibiting the use of the head-light unless said light has some means to control the direction of the rays of light in such manner that the driver of the oncoming automobile will not be blinded by the rays of light.

Many expedients have been tried, with more or less success, to control the direction of rays of light without reducing the efficiency of the light for driving purposes.

The object of our invention is to overcome the defects which we have discovered in existing light controlling devices, and to produce means which will direct the rays of light parallel with, and at a prescribed distance above, the road bed throughout the entire length of the beam of light, and, at the same time, maintain a flood of light rays on the road bed from the outermost end of the longest ray of light, to a point within approximately ten (10) feet in front of the automobile carrying the light; and with these and other objects in view our invention consists of the parts, and combination of parts, as will be here-in-after more fully set forth.

In the drawing

Figure 1:
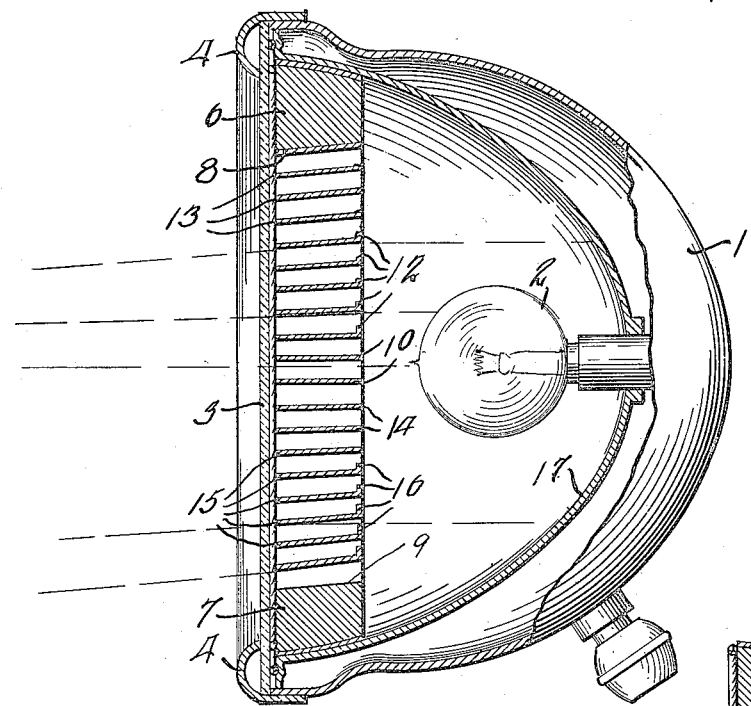
Figure 1 is a side elevation of the standard head-light with our invention attached thereto, parts being in section.
Figure 2:
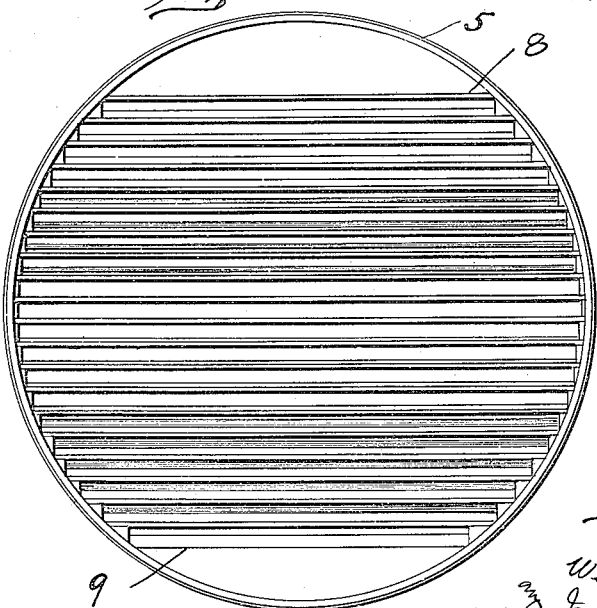
Figure 2 is a front elevation of Figure 1.
Figure 3:
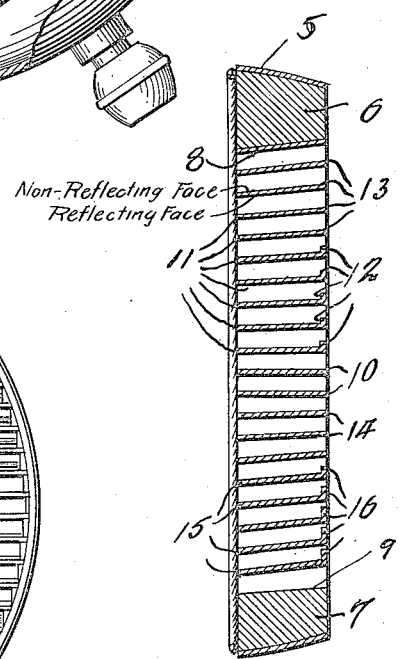
Figure 3 is a vertical section of the attachment embodying our invention, detached from the head-light.

The reference numeral 1 designates a head-light of any approved construction, in which is mounted a light bulb, 2. The head-light is provided with suitable glass, 3, which is secured to the head-light by a suitable clamping ring, 4. All of the elements thus far named may be of any approved construction or design, inasmuch as it is the object of our invention to produce a light ray controlling attachment which will be standard to the head-lights now on the market, and may be readily secured in the head-lights by merely removing the lens glass and clamping ring and inserting the attachment in the head-light, the attachment being held in the head-light by the usual lens and clamping ring.

Our attachment comprises a metal, or other suitable frame, 5, formed on the arc of the standard reflectors used in the standard automobile head-lights, said frame, 5, having mounted therein a number of parallel horizontally disposed light ray controlling partitions, each of which has one reflecting surface and one non-reflecting surface. Filler blocks, 6 and 7, are mounted at the top and bottom of the frame, 5, the outer circumference of each of which being on the same arc as the inner face of the frame, 5, while the faces, 8 and 9, of these blocks are formed on a flat plane and when in position these faces are parallel with each other.

The light beam controlling horizontally disposed partitions may be made of cathedral, or other glass, metal, or any other material found suitable for the purpose.

The horizontally disposed partitions, 10, are parallel with each other, and are positioned on either side of the axis of the lamp 2, so that the direct horizontal light rays pass substantially parallel between these two partitions, 10.

The partitions 11 are, as shown in the drawings, deflected downwardly from the rear of the frame 5 toward the front of the frame, and are provided with ray obstructors 12 so that the rays of light passing between these partitions are deflected downwardly a prescribed distance in front of the headlight. The deflecting partitions 13 near the uppermost part of frame 5 are downwardly and upwardly inclined so that the rays of light passing between them will also be deflected outwardly and downwardly, but these partitions have no obstructors like the partitions 11.

The partitions 14 are deflected outwardly and downwardly at an angle as are also partitions 15, but the partitions 15 are provided with obstructors 16. The obstructors 12 and 16 prevent outwardly directed rays which might otherwise pass through the partitions from the lamp or the reflector.

These reflecting partitions are each provided, as above stated, with non-reflecting upper face and a reflecting under face, and the angularity of each individual partition is so disposed that the ray of light is deflected therefrom as directed, down upon the road bed in front of the automobile, at a predetermined range from the front of the automobile so that we are enabled to get a flood of light upon the road bed from approximately ten (10) feet in front of the automobile, to the end of the effective point of the horizontally direct light ray.

From demonstration we have found that this flood light area is approximately of a triangular shape, that the base of the triangle is at the outer end of the light rays.

The distance of the uppermost ray of light from the road bed can be determined by the position of the partitions, 10.

In actual use of our invention we have found that it does not permit any light rays to be reflected into the face of the driver of an on coming automobile, and we have also found that it complies with many, if not all, of the State laws governing head-lights for automobiles.

While we have shown the invention as being embodied as an attachment which may be readily fitted in any standard automobile head-light, at the same time, it is, of course, understood that it may be formed as a part of the head-light structure and that there may be other changes made in our invention, without departing from the scope of the appended claim.

What we claim is:

A light deflecting attachment for automobile head lights comprising a metal frame adapted to fit within the headlight, filler blocks mounted transversely in said frame at the top and bottom thereof, parallel horizontal partitions extending transversely of said frame and positioned substantially midway the height of the frame, a series of downwardly inclined partitions extending transversely of the frame above and below the said parallel partitions, said partitions having a non-reflecting upper face and a lower reflecting face, and obstructors extending upwardly at an angle from the rear edge of some of said inclined partitions.

In testimony whereof we affix our signatures.

WILLIAM R. STEINHAUER.
JACOB N. PRUTZMAN.